(12) United States Patent
Masih et al.

(10) Patent No.: US 9,463,750 B2
(45) Date of Patent: Oct. 11, 2016

(54) TAILGATE COMPARTMENT RELEASE MECHANISM ARRANGEMENT

(71) Applicant: GM GLOBAL TECHNOLOGY OPERATIONS LLC, Detroit, MI (US)

(72) Inventors: Anil A. Masih, Royal Oak, MI (US); Gary W. Krajenke, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/533,143

(22) Filed: Nov. 5, 2014

(65) Prior Publication Data
US 2016/0121801 A1    May 5, 2016

(51) Int. Cl.
| | |
|---|---|
| *B60R 9/06* | (2006.01) |
| *B62D 33/027* | (2006.01) |
| *B60R 7/00* | (2006.01) |
| *B60R 11/06* | (2006.01) |
| *B62D 33/03* | (2006.01) |

(52) U.S. Cl.
CPC . *B60R 9/06* (2013.01); *B60R 7/00* (2013.01); *B62D 33/0273* (2013.01); *B60R 11/06* (2013.01); *B62D 33/03* (2013.01)

(58) Field of Classification Search
CPC .......... B60R 9/06; B60R 11/06; B60R 7/00; B62D 33/0273; B62D 33/03

USPC ..................................... 296/57.1, 26.11, 37.6
See application file for complete search history.

(56) References Cited

U.S. PATENT DOCUMENTS

| | | | | |
|---|---|---|---|---|
| 5,518,158 A | * | 5/1996 | Matlack .................... | B60R 9/00 224/402 |
| 6,641,190 B2 | * | 11/2003 | Kirchhoff .......... | B62D 33/0273 296/26.08 |

* cited by examiner

*Primary Examiner* — Joseph D Pape
*Assistant Examiner* — Dana Ivey
(74) *Attorney, Agent, or Firm* — Quinn Law Group, PLLC

(57) ABSTRACT

A tailgate assembly for a vehicle includes a structure that defines a compartment, and a cover that is moveably attached to the structure to cover the compartment. A compartment latch mechanism is attached to the structure for latching the cover to the structure. A compartment release mechanism is coupled to the compartment latch mechanism for actuating the compartment latch mechanism. The compartment release mechanism is disposed on one of a first lateral edge surface or a second lateral edge surface of the structure. When the tailgate assembly is disposed in a first position, the body of the vehicle conceals the compartment release mechanism to prevent access to the compartment release mechanism, thereby preventing actuation of the compartment latch mechanism and securing the cover relative to the structure.

15 Claims, 4 Drawing Sheets

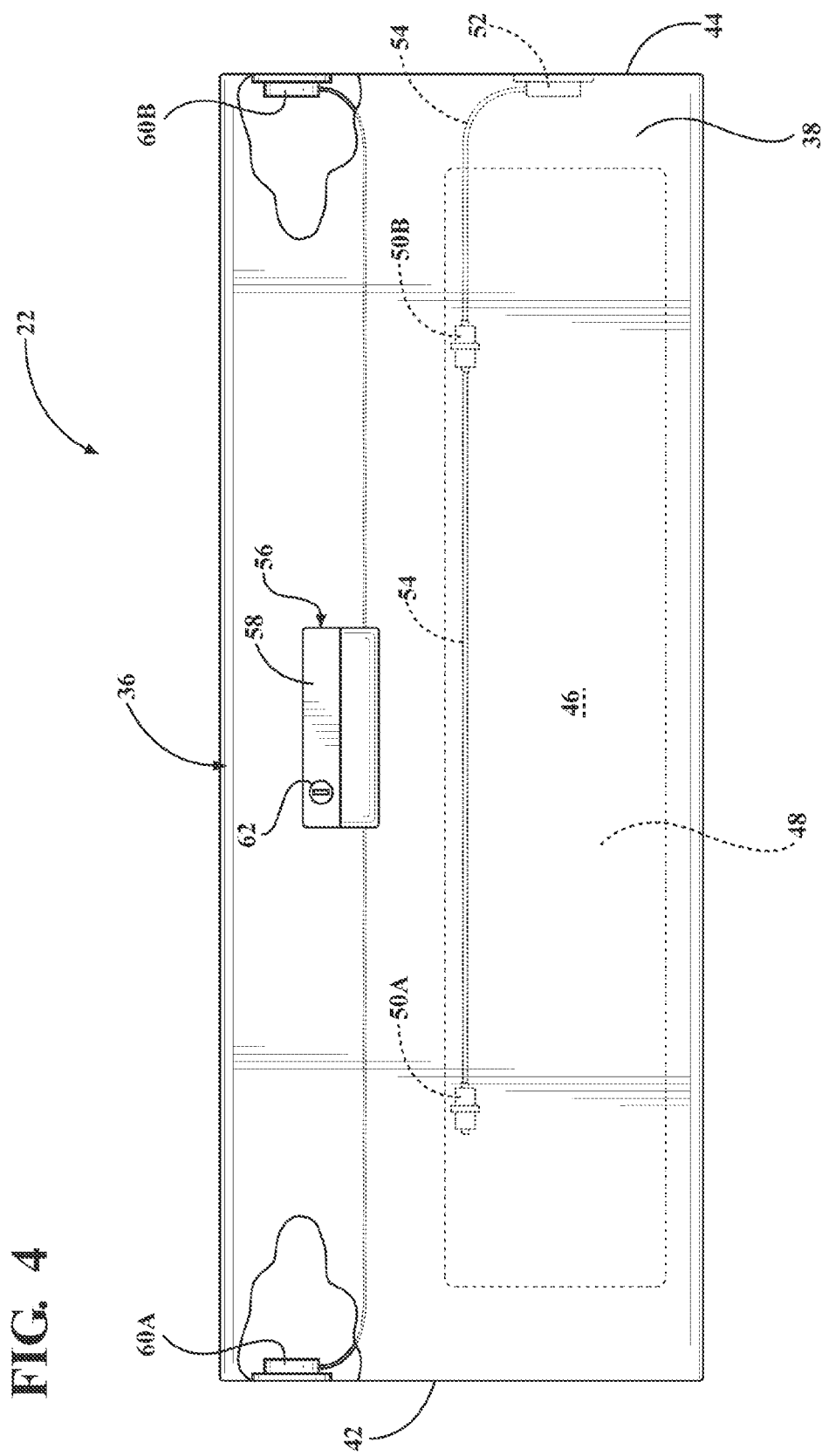

TAILGATE COMPARTMENT RELEASE MECHANISM ARRANGEMENT

TECHNICAL FIELD

The disclosure generally relates to a tailgate assembly for a vehicle.

BACKGROUND

Vehicles may include a tailgate assembly to close an end of a cargo area. For example, in pick-up trucks, the tailgate assembly is used to close an open bed of the truck, whereas in Sport Utility Vehicles (SUV), the tailgate assembly may be used to close the enclosed rear cargo area of the SUV. The tailgate assembly may define a cargo storage compartment, and include a cover that closes the cargo storage compartment. The cover is typically disposed within an interior of the cargo area when the tailgate assembly is closed. If the tailgate assembly is used to close a cargo area that is defined by an enclosed interior space of the vehicle, such as a cargo area of an SUV, then access to the cover may be denied by locking the doors of the SUV, thereby preventing access to the cargo area of the SUV. However, in vehicles that do not define a closed cargo area, such as an open bed of a pick-up truck, then access to the cover of the tailgate storage compartment is always available. In order to prevent unwanted access to the cargo storage compartment of the tailgate assembly in these situations, the tailgate assembly must be configured to secure the cover in place in order to prevent access to the tailgate storage compartment.

SUMMARY

A vehicle is provided. The vehicle includes a body; and a tailgate assembly moveably attached to the body. The tailgate assembly includes a structure having an interior surface defining a compartment, a first lateral edge surface, and a second lateral edge surface. The first lateral edge surface and the second lateral edge surface are disposed on opposite lateral edges of the structure. A cover is moveably attached to the structure for covering the compartment. A compartment latch mechanism is attached to the structure, and is operable to latch the cover to the structure. A compartment release mechanism is coupled to the compartment latch mechanism, and is disposed adjacent one of the first lateral edge surface or the second lateral edge surface of the structure. The compartment release mechanism is concealed by the body when the tailgate assembly is disposed in a first position, and is exposed when the tailgate assembly is disposed in a second position.

A tailgate assembly for a vehicle is also provided. The tailgate assembly includes a structure having an exterior surface, an interior surface, a first lateral edge surface, and a second lateral edge surface. The interior surface defines a compartment. A cover is moveably attached to the structure. The cover is moveable between a closed position for sealing the compartment, and an open position allowing access to the compartment. A compartment latch mechanism is attached to the structure. The compartment latch mechanism is moveable between a latch position that is operable to latch the cover relative to the structure, and a release position that is operable to release the cover to allow movement of the cover relative to the structure. A compartment release mechanism is coupled to the compartment latch mechanism. The compartment release mechanism is disposed on one of the first lateral edge surface or the second lateral edge surface of the structure. The compartment release mechanism is operable to move the compartment latch mechanism between the latch position and the release position.

Accordingly, because the compartment release mechanism is disposed on one of the first lateral edge surface or the second lateral edge surface of the tailgate assembly, the compartment release mechanism is covered by the body of the vehicle when the tailgate assembly is disposed in the first, i.e., a closed position. In so doing, if the tailgate is locked to the body to prevent movement of the tailgate assembly relative to the body, then access to the compartment release mechanism is denied, and the cover cannot be released, thereby securing the storage compartment of the tailgate assembly even if the tailgate assembly is used to close an open cargo area, such as a bed of a pick-up truck.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 4 is a schematic, partially cut-away, plan view of the tailgate assembly.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
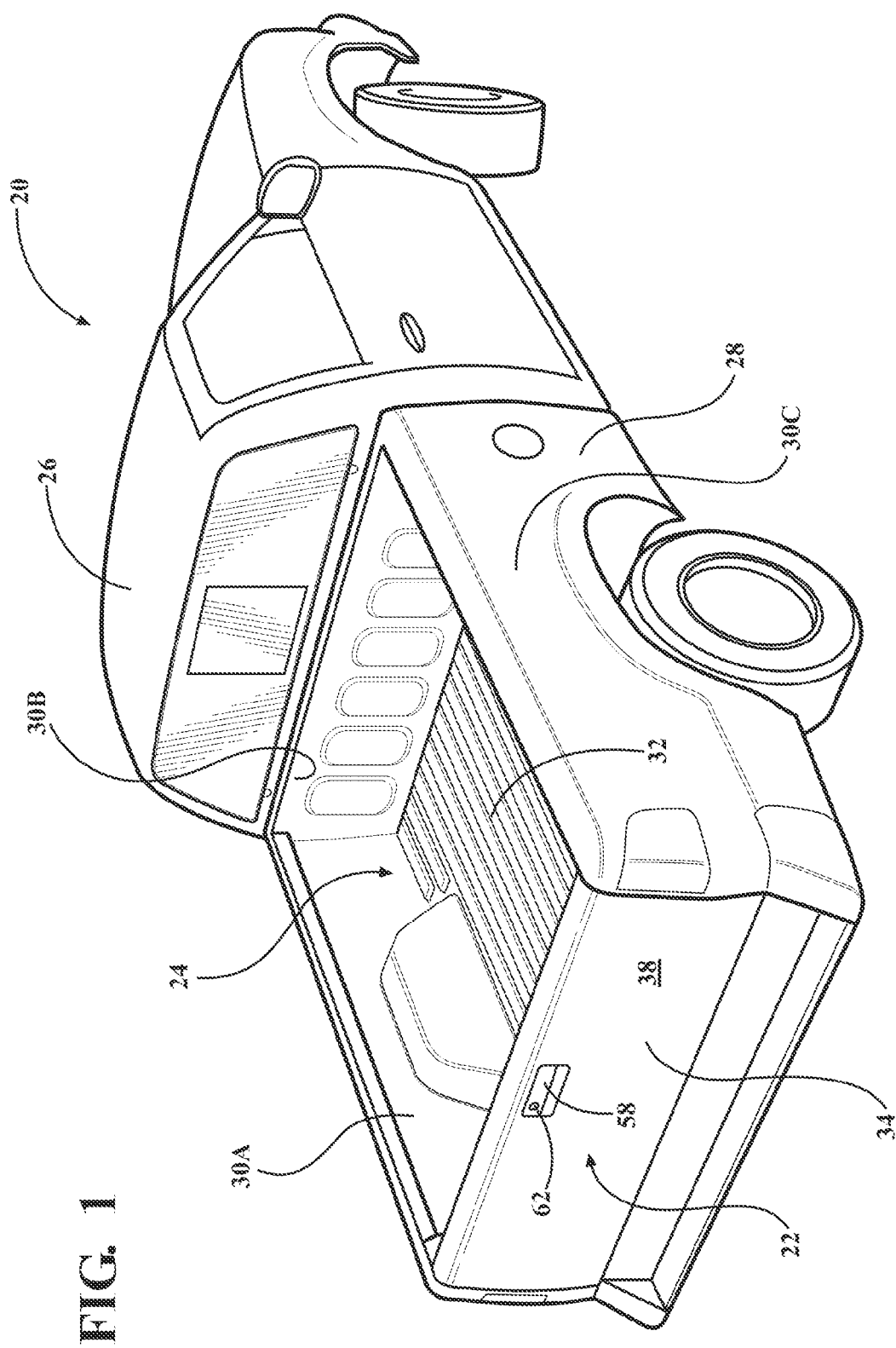
FIG. 1 is a schematic perspective view of a vehicle showing a tailgate assembly in a first position.
Figure 2:
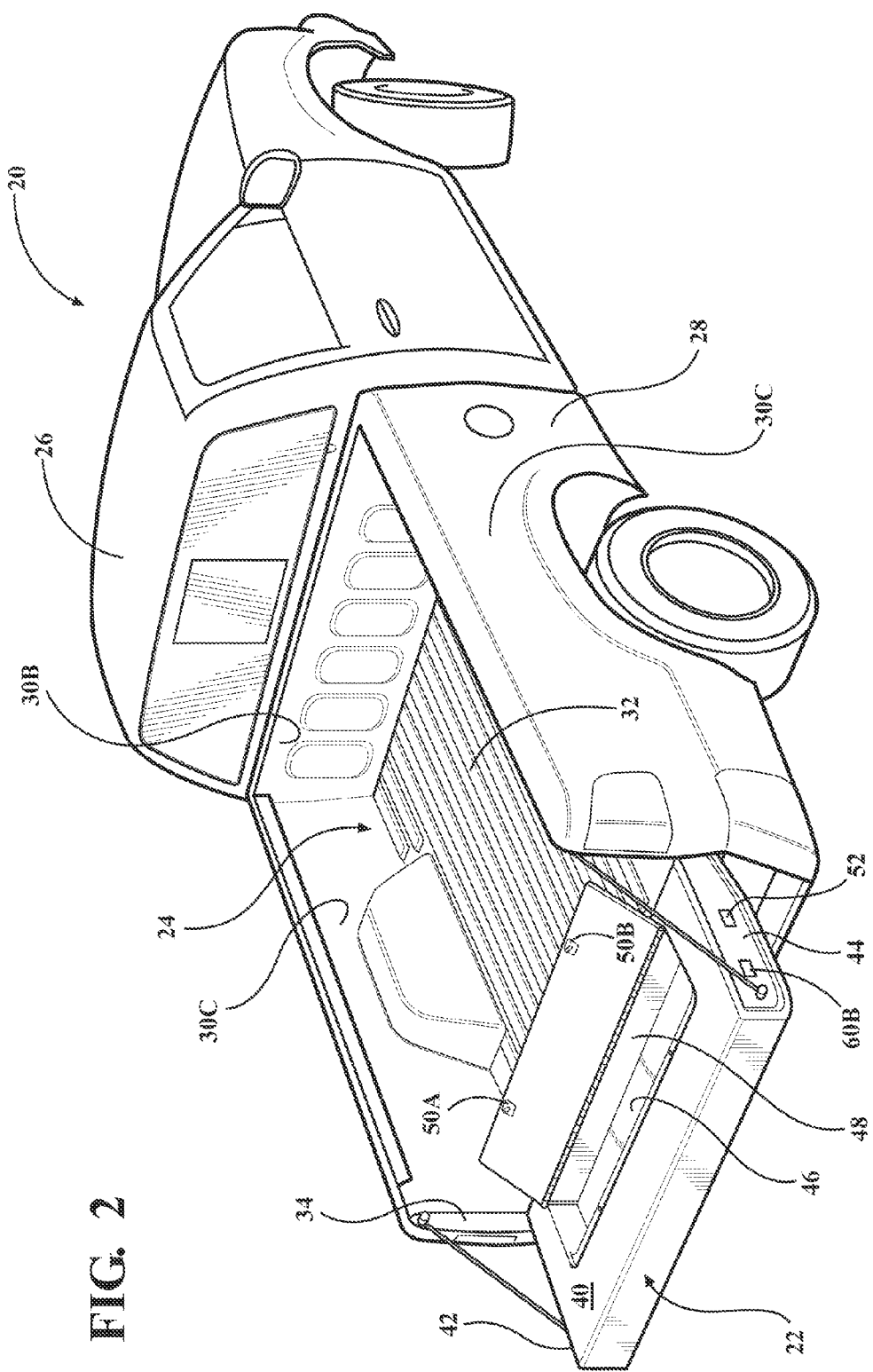
FIG. 2 is a schematic perspective view of the vehicle showing the tailgate assembly in a second position, with a cover of a tailgate compartment in an open position.

Referring to the Figures, wherein like numerals indicate like parts throughout the several views, a vehicle is generally shown at 20. Referring to FIGS. 1 and 2, the vehicle 20 is shown configured as a pick-up truck. However, it should be appreciated that the vehicle 20 may be configured in some other manner, such as a Sport Utility Vehicle (SUV), or other similar style that uses an endgate, hereinafter referred to as a tailgate assembly 22, to close a cargo area 24 of the vehicle 20.

The vehicle 20 includes a body 26, which defines the cargo area 24. As shown in FIGS. 1 and 2, the vehicle 20 is shown as a pick-up truck, having an open cargo area 24, hereinafter referred to as a bed 28, with the bed 28 defining the cargo area 24. However, it should be appreciated that the disclosure may be applied to other types of vehicles that include an enclosed cargo area 24, such as an SUV.

As shown in FIGS. 1 and 2, the bed 28 includes three lateral sides 30 and a bottom 32. The three lateral sides 30 include a first lateral side 30A, a second lateral side 30B, and a third lateral side 30C. The first lateral side 30A, the second lateral side 30B, and the third lateral side 30C are referred to generally within the written specification by the reference numeral 30 and are referred to specifically and shown within the drawings by the reference numerals 30A, 30B, and 30C respectively. The body 26, and more specifically the bed 28, is open on a fourth lateral side 34. Also as shown in FIGS. 1 and 2, the bed 28 is open on top. However, it should be appreciated that if the vehicle 20 includes an enclosed cargo area 24, such as an SUV, then the top of the cargo area 24 will be covered by the body 26, but the fourth lateral side 34 of the body 26 is open.

The tailgate assembly 22 is moveably attached to body 26 at the fourth lateral side 34 of the bed 28, i.e., the open side of the body 26. As shown in FIGS. 1 and 2, the tailgate assembly 22 is pivotably attached to the body 26 for rotational movement relative to the body 26 about a generally horizontal axis. However, it should be appreciated that the tailgate assembly 22 may be moveably attached to the body 26 for rotational movement relative to the body 26 about a generally vertical axis. The tailgate assembly 22 is moveable between a first position and a second position. The first position may be defined as a closed position, and closes or covers the open end of the body 26, i.e., the fourth lateral side 34 of the body 26. The second position may be defined as an open position, and opens or allows access to the cargo area 24 of the body 26. FIG. 1 shows the tailgate assembly 22 disposed in the first position, i.e., the closed position, and FIG. 2 shows the tailgate assembly 22 disposed in the second position, i.e., the open position. The tailgate assembly 22 may be rotatably attached to the body 26 in any suitable manner. For example, the tailgate assembly 22 may be attached to the body 26 by one or more hinges, or other similar mechanism.

Figure 3:
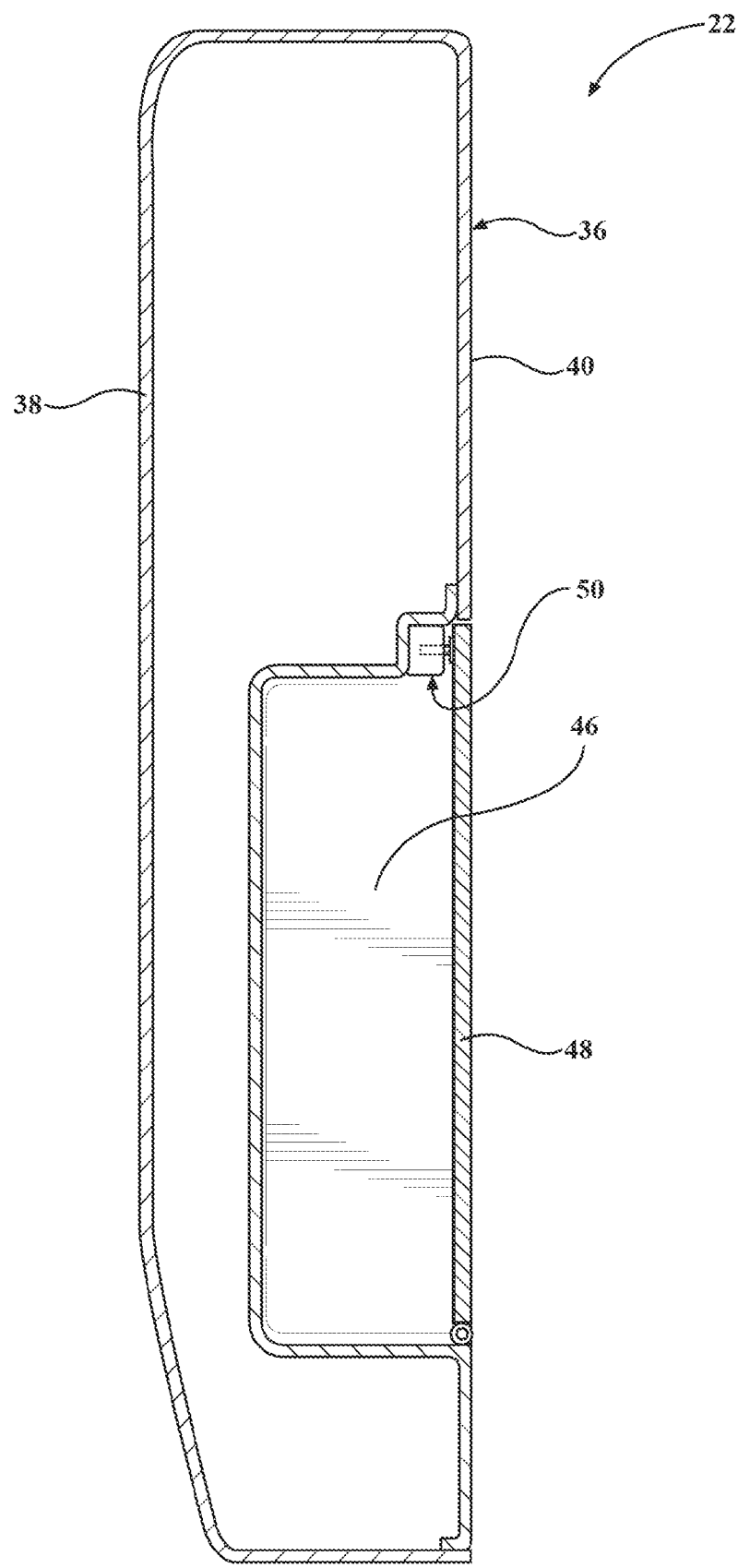
FIG. 3 is a schematic cross sectional view of the tailgate assembly, showing the cover in a closed position.

Referring also to FIGS. 3 and 4, the tailgate assembly 22 includes a structure 36. The structure 36 may include one or more components formed to define the shape of the tailgate assembly 22, and provide the required structural rigidity. The structure 36 may include one or more frame members, braces, exterior and/or interior panel members, trim pieces, etc., attached together to define the completed assembly. As best shown in FIG. 3, the structure 36 includes an exterior surface 38 and an interior surface 40. As best shown in FIG. 4, the structure 36 includes a first lateral edge surface 42, and a second lateral edge surface 44. Referring to FIGS. 1 and 2, the interior surface 40 is disposed adjacent the cargo area 24, within the interior of the vehicle 20 defining the cargo area 24, when the tailgate assembly 22 is disposed in the first position. As such, the interior surface 40 may be defined as the interior of the tailgate assembly 22. As best shown in FIG. 3, the exterior surface 38 defines the exterior of the tailgate assembly 22, and is disposed generally opposite from the interior surface 40. As best shown in FIG. 4, the first lateral edge surface 42 and the second lateral edge surface 44 are disposed opposite each other, at opposing lateral edges of the interior surface 40 and the exterior surface 38. As such, the first lateral edge surface 42 and the second lateral edge surface 44 extend between the exterior surface 38 and the interior surface 40. Referring to FIG. 1, when the tailgate assembly 22 is disposed in the first position, i.e., the closed position, the first lateral edge surface 42 and the second lateral edge surface 44 are concealed and/or covered by the body 26. Referring to FIG. 2, when the tailgate assembly 22 is disposed in the second position, i.e., the open position, the first lateral edge surface 42 and the second lateral edge surface 44 are exposed and accessible.

Referring to FIGS. 2 and 3, the interior surface 40 of the tailgate assembly 22 defines a storage compartment 46. The compartment 46 may be sized and/or shaped in any desirable manner, but is generally defined by a volume that is recessed into the interior surface 40 of the tailgate assembly 22. The tailgate assembly 22 includes a cover 48, which is moveably attached to the structure 36. The cover 48 is operable to close the compartment 46. The cover 48 is moveable between a closed position and an open position. When disposed in the closed position, the cover 48 seals or closes the compartment 46. When disposed in the open position, the cover 48 opens or allows access to the compartment 46. The cover 48 is shown in the open position in FIG. 2, and is shown in the closed position in FIG. 3. As shown, the cover 48 is rotatable about a generally horizontal axis. However, it should be appreciated that the cover 48 may be configured for rotation relative to the structure 36 of the tailgate assembly 22 about a generally vertical axis. The cover 48 may be rotatably attached to the structure 36 in any suitable manner. For example, the cover 48 may be attached to the structure 36 by one or more hinges or other similar mechanism.

Referring to FIGS. 3 and 4, the tailgate assembly 22 includes a compartment latch mechanism 50. The compartment latch mechanism 50 is attached to the structure 36. The compartment latch mechanism 50 may be actuated, i.e., moved, between a latch position and a release position. When the compartment latch mechanism 50 is moved into the latch position, the compartment latch mechanism 50 is operable to latch the cover 48 to the structure 36 of the tailgate assembly 22, thereby closing the compartment 46. When the compartment latch mechanism 50 is moved into the release position, the compartment latch mechanism 50 is operable to release the cover 48 to allow rotational movement of the cover 48 relative to the structure 36, thereby providing access to the compartment 46.

The compartment latch mechanism 50 may include any suitable style and/or configuration of latch, capable of releasable latching the cover 48 to the structure 36 of the tailgate assembly 22. Preferably, the compartment latch mechanism 50 is disposed a distance inboard of either the first lateral edge surface 42 and/or the second lateral edge surface 44. As shown, the tailgate assembly 22 includes a first compartment latch mechanism 50A and a second compartment latch mechanism 50B, equally spaced from the first lateral edge surface 42 and the second lateral edge surface 44 respectively. The first compartment latch mechanism 50A and the second compartment latch mechanism 50B are referred to generally within the written specification by the reference numeral 50 and are referred to specifically and shown within the drawings by the reference numerals 50A, and 50B respectively. It should be appreciated that the position of the compartment latch mechanism 50 may differ from the exemplary embodiment shown in the Figures. For example, the tailgate assembly 22 may only include a single compartment latch mechanism 50 disposed at an approximate longitudinal centerline of the vehicle 20, or a single compartment latch mechanism 50 disposed adjacent one of the first lateral edge surface 42 and/or the second lateral edge surface 44.

Referring to FIGS. 3 and 4, the tailgate assembly 22 further includes a compartment release mechanism 52 that is coupled to the compartment latch mechanism 50. The compartment release mechanism 52 is operable to move the compartment latch mechanism 50 between the latch position and the release position. The compartment release mechanism 52 may be coupled to the compartment latch mechanism 50 in any suitable manner that allows the compartment release mechanism 52 to control and/or actuate the compartment latch mechanism 50. For example, a cable 54 may interconnect the compartment latch mechanism 50 and the compartment release mechanism 52. Actuation of the compartment release mechanism 52 transfers movement through the cable 54 to the compartment latch mechanism 50, to move the compartment latch mechanism 50 between the latch position and/or the release position. The compartment release mechanism 52 may include any suitable mechanism capable of actuating the compartment latch mechanism 50, and may include, for example, a levered pull handle 58 operable to apply a linear force to the cable 54.

The compartment release mechanism 52 is disposed on or adjacent to one of the first lateral edge surface 42 or the second lateral edge surface 44 of the structure 36. As such, the compartment release mechanism 52 is attached to the structure at either the first lateral edge surface 42 or the second lateral edge surface 44. Accordingly, the compartment release mechanism 52 is concealed by the body 26 when the tailgate assembly 22 is disposed in the first position, i.e., the closed position, such as is shown in FIG. 1. The compartment release mechanism 52 is exposed when the tailgate assembly 22 is disposed in the second position, i.e., the open position, such as is shown in FIG. 2. As such, when the tailgate assembly 22 is disposed in the first position, the compartment release mechanism 52 is disposed between the body 26 and one of the first lateral edge surface 42 or the second lateral edge surface 44 of the structure 36, thereby concealing the compartment release mechanism 52 and preventing access to the compartment release mechanism 52.

Referring to FIG. 4, the tailgate assembly 22 includes a tailgate latch system 56, which is operable to latch the tailgate assembly 22 to the body 26, when the tailgate assembly 22 is disposed in the first position. The tailgate latch system 56 may be configured in any suitable manner. For example, the tailgate latch system 56 may include a handle 58 that is operable to actuate a first tailgate latch 60A and a second tailgate latch 60B disposed at the first lateral edge surface 42 and the second lateral edge surface 44 of the structure 36 respectively. The first tailgate latch 60A and the second tailgate latch 60B are operable to latch the tailgate assembly 22 to the body 26 of the vehicle 20, and may be configured in any manner suitable for the specific configuration of the vehicle 20.

The tailgate latch system 56 may further include a lock assembly 62 that is operable to lock the tailgate latch system 56 and secure the tailgate assembly 22 to the body 26 in the first position. The lock assembly 62 may be configured in any suitable manner that is capable of locking the tailgate latch system 56. When locked, the lock assembly 62 prevents the release of the tailgate latch system 56, thereby preventing the rotational movement of the tailgate assembly 22 relative to the body 26, and keeping the tailgate assembly 22 secured in the first position, i.e., the closed position. When un-locked, the lock assembly 62 allows movement of the tailgate assembly 22 relative to the body 26 of the vehicle 20.

Because the compartment release mechanism 52 is disposed on one of the first lateral edge surface 42 or the second lateral edge surface 44 of the tailgate assembly 22, which is covered or concealed by the body 26 of the vehicle 20, e.g., the bed 28 as shown in FIG. 1, the compartment release mechanism 52 may only be accessed when the tailgate assembly 22 is moved into the second position, i.e., the open position. Locking the tailgate assembly 22 in the first position, i.e., the closed position, by locking the tailgate latch system 56 with the lock assembly 62, denies or prevents access to the compartment release mechanism 52. Preventing access to the compartment release mechanism 52, prevents access to the compartment 46. Accordingly, the compartment 46 may be secured, i.e., indirectly locked, by locking the tailgate assembly 22, thereby providing security for the compartment 46 in vehicles having an open cargo area 24, such as a pick-up truck. Positioning the compartment release mechanism 52 on one of the first lateral edge surface 42 or the second lateral edge surface 44, allows the compartment 46 to be secured by locking the tailgate assembly 22, without the need of a dedicated lock system for the compartment latch mechanism 50.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A vehicle comprising:
a body; and
a tailgate assembly moveably attached to body, wherein the tailgate assembly includes:
a structure including an interior surface defining a compartment, a first lateral edge surface, and a second lateral edge surface, wherein the first lateral edge surface and the second lateral edge surface are disposed on opposite lateral edges of the structure;
a cover moveably attached to the structure for covering the compartment;
a compartment latch mechanism attached to the structure and operable to latch the cover to the structure; and
a compartment release mechanism operatively coupled to the compartment latch mechanism for actuating the compartment latch mechanism, and disposed adjacent one of the first lateral edge surface or the second lateral edge surface of the structure;
wherein the compartment release mechanism is concealed by the body when the tailgate assembly is disposed in a first position, and wherein the compartment release mechanism is exposed when the tailgate assembly is disposed in a second position.

2. The vehicle set forth in claim 1 wherein the tailgate assembly includes a cable interconnecting the compartment latch mechanism and the compartment release mechanism.

3. The vehicle set forth in claim 1 wherein the tailgate assembly includes a tailgate latch system operable to latch the tailgate assembly to the body when the tailgate assembly is disposed in the first position.

4. The vehicle set forth in claim 3 wherein the tailgate latch system includes a lock assembly operable to lock the tailgate latch system and secure the tailgate assembly to the body in the first position.

5. The vehicle set forth in claim 1 wherein the compartment release mechanism is disposed between the body and one of the first lateral edge surface or the second lateral edge surface when the tailgate assembly is disposed in the first position.

6. The vehicle set forth in claim 5 wherein the body covers both the first lateral edge surface and the second lateral edge surface when the tailgate assembly is disposed in the first position.

7. The vehicle set forth in claim 1 wherein the body includes three lateral sides and a bottom, and is open to a fourth lateral side and to a top.

8. A vehicle comprising:
a body including a bed, wherein the bed includes three lateral sides and a bottom, and is open on a fourth lateral side and a top; and
a tailgate assembly moveably attached to the bed at the fourth lateral side of the bed, wherein the tailgate assembly includes:
- a structure including an exterior surface, an interior surface, a first lateral edge surface, and a second lateral edge surface, wherein the interior surface defines a compartment;
- a cover moveably attached to the structure for movement between a closed position sealing the compartment, and an open position allowing access to the compartment;
- a compartment latch mechanism attached to the structure and moveable between a latch position operable to latch the cover relative to the structure, and a release position operable to release the cover to allow movement of the cover relative to the structure;
- a compartment release mechanism coupled to the compartment latch mechanism and disposed adjacent one of the first lateral edge surface or the second lateral edge surface of the structure, wherein the compartment release mechanism is operable to move the compartment latch mechanism between the latch position and the release position;
- wherein the compartment release mechanism is concealed by the bed when the tailgate assembly is disposed in a first position, and wherein the compartment release mechanism is exposed when the tailgate assembly is disposed in a second position; and
- a tailgate latch system operable to latch the tailgate assembly to the bed when the tailgate assembly is disposed in the first position, wherein the tailgate latch system includes a lock assembly operable to lock the tailgate latch system and secure the tailgate assembly to the bed in the first position.

9. The vehicle set forth in claim 8 wherein the tailgate assembly includes a cable interconnecting the compartment latch mechanism and the compartment release mechanism.

10. The vehicle set forth in claim 8 wherein the compartment release mechanism is disposed between the bed and one of the first lateral edge surface or the second lateral edge surface when the tailgate assembly is disposed in the first position.

11. The vehicle set forth in claim 8 wherein the bed covers both the first lateral edge surface and the second lateral edge surface when the tailgate assembly is disposed in the first position.

12. A tailgate assembly for a vehicle, the tailgate assembly comprising:
- a structure including an exterior surface, an interior surface, a first lateral edge surface, and a second lateral edge surface, wherein the interior surface defines a compartment;
- a cover moveably attached to the structure for movement between a closed position sealing the compartment, and an open position allowing access to the compartment;
- a compartment latch mechanism attached to the structure and moveable between a latch position operable to latch the cover relative to the structure, and a release position operable to release the cover to allow movement of the cover relative to the structure;
- a compartment release mechanism coupled to the compartment latch mechanism and disposed adjacent one of the first lateral edge surface or the second lateral edge surface of the structure, wherein the compartment release mechanism is operable to move the compartment latch mechanism between the latch position and the release position.

13. The tailgate assembly set forth in claim 12 further comprising a cable interconnecting the compartment latch mechanism and the compartment release mechanism.

14. The tailgate assembly set forth in claim 12 further comprising a tailgate latch system operable to latch the tailgate assembly to a body of the vehicle when the tailgate assembly is disposed in a first position.

15. The tailgate assembly set forth in claim 14 wherein the tailgate latch system includes a lock assembly operable to lock the tailgate latch system and secure the tailgate assembly to the body in the first position.

* * * * *